Sept. 19, 1967    OSAMU SHOJI ET AL    3,342,608
PRODUCT AND METHOD FOR IMPROVING FROZEN DESSERTS
Filed Sept. 23, 1963
Fig. 1    COOLING EFFECT ON THE VISCOSITY OF ICE MILK PRE-MIXTURE
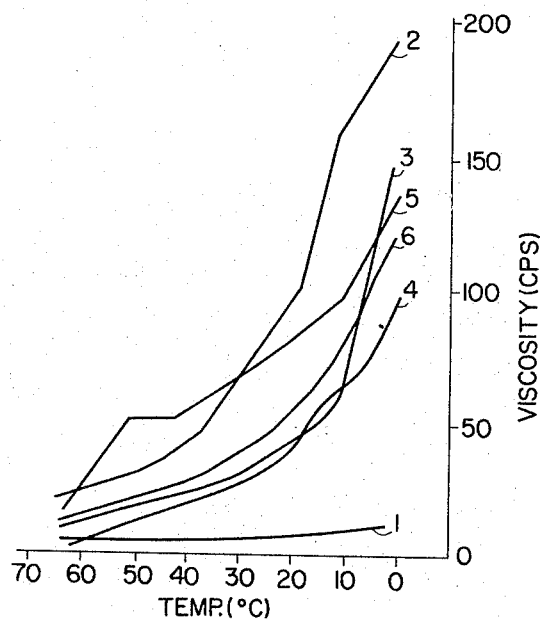
Fig. 2    OVER RUN OF ICE MILK PRE-MIXTURE
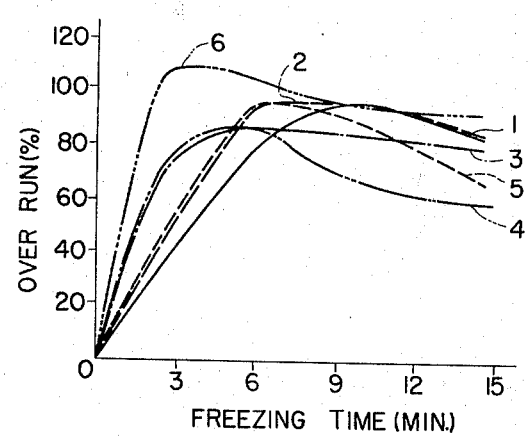

United States Patent Office 3,342,608
Patented Sept. 19, 1967

3,342,608
PRODUCT AND METHOD FOR IMPROVING FROZEN DESSERTS
Osamu Shoji, Ikeda-shi, Osaka-fu, Kazuo Wada, Sakai-shi, Osaka-fu, Atsushi Tamura, Toyonaka-shi, Osaka-fu, and Keiichi Wada, Nishiyodogawa-ku, Osaka, Japan, assignors to Dainippon Pharmaceutical Co., Ltd., Osaka, Japan, a corporation of Japan
Filed Sept. 23, 1963, Ser. No. 310,710
Claims priority, application Japan, Sept. 25, 1962, 37/42,109
4 Claims. (Cl. 99—136)

This invention relates to an improved method for production of frozen desserts and the products thereof. More particularly, this invention relates to production of frozen desserts such as ice cream, ice milk, fruit sherbet and water ice, with the use as a stabilizer of tamarind seed gelose.

An ice cream mix is composed substantially of a mixture of milk fat, milk solid and sugar. The mixing ratios of those components vary in accordance with State regulations and commercial needs. An ordinary ice cream contains about 12% by weight or more of milk fat, about 10% weight of milk solid, and about 16% by weight of sugar. Ice milk is generally of similar composition, but usually its milk fat content is less, say, 2–10%. Fruit sherbet mix is substantially composed of an organic acid such as citric acid, tartaric acid, lactic acid, and malic acid, in an amount as will give a titratable acidity not less than 0.35% by weight as converted to lactic acid, 1–2% by weight of milk fat, sugar and a fruit component. Water ice is of the similar composition to fruit sherbet, but contains no milk fat.

In the production of those frozen desserts, for the purposes of bringing about a suitable over run effect, of preventing whey off, and of imparting to the products heat shock resistance, water-holding property (a property to prevent ice crystals growth during storage), suitable smoothness and pleasant taste, a stabilizer is added to the mix. As the stabilizer, first starch was used, and recently gelatin, sodium alginate, natural gums, sodium carboxymethylcellulose, and methylcellulose, etc. are used.

Among these, gelatin has a good solubility but for the same to exhibit its stabilizing effect, the mix must be aged. The viscosity of the mix rapidly falls with rise of temperature, and therefore, the product has poor heat shock resistance. Sodium alginate is very susceptible to the influences of acids and metal salts, and tends to form an insoluble gel together with calcium. Thus, the products in which sodium alginate is used as the stabilizer have good heat shock resistance, but poor melt down. While locust beam gum and sodium carboxymethylcellulose have good over run effect, they tend to form whey off and are unstable to acids. Methylcellulose shows an over run effect too early during the initial stage of freezing, and therefore, the products containing the same have poor heat shock resistance. Carrageenin (Irish moss extractive) shows an excellent whey off-preventing effect as combined with casein, but this gel has a bad texture alike agar, showing a low water-holding property and over-run effect. Pectin is acid-stable, but has low over-run effect. Corn starch is cheap and gives products having good heat shock resistance, however has such drawbacks as poor melt down, texture and flavour.

Thus, each one of heretofore used stabilizers has its characteristic advantages as well as drawbacks, and therefore they are seldom used singly, but generally used in combination of two or more.

An object of this invention is to provide an improved method for production of frozen desserts such as ice cream, ice milk, fruit sherbet and water ice.

It is particularly the object of this invention to provide pre-mixture for a frozen dessert of which viscosity is little affected by presence of an acid or salt, and temperature changes, and to provide a method for production of frozen desserts with good over-run effect, using the aforesaid pre-mixture.

Another object of this invention is to provide frozen desserts having improved heat shock resistance and water-holding property, and which show good melt down in man's mouth when eaten. Other objects and advantages will become apparent from reading the rest of the specification.

We found that tamarind seed gelose gives tasty products of good texture used as a stabilizer by itself, or combined with other known stabilizers.

Tamarind seed gelose is a polysaccharide composed of glucose, xylose and galactose, which is the chief component of the seed of a Legminosae evergreen tree, *Tamarindus indica* Linn, which is indigenous to the tropical area. An aqueous solution of tamarind seed gelose is mucilaginous, and forms gel in the presence of sugar similarly to fruit pectin. However, its gel-forming conditions are very different from those for pectin. That is, pectin requires a sugar concentration of 60–70% and presence of an acid (optimum pH 2.8), but tamarind seed gelose forms gel at a sugar concentration of 45–60% under the optimum pH in the vicinity of 2.6, but the presence of an acid is not absolutely necessary. In this respect tamarind seed gelose is a very unique polysaccharide.

For the production of tamarind seel gelose, finely divided seeds or tamarind kernel powder which is used as a sizing agent for textiles is extracted with hot water, and thereafter either centrifuged, filtered, concentrated and dried, or recovered after coagulation precipitation, dried and pulverized. Or, finely divided seeds of tamarind kernel powder is soaked in sulfurous acid water, and removed of impurities such as proteins and fats. The resultant dry powder is white or ashen white, tasteless and odorless, and has not toxicity.

In this invention, at least 0.05% to the total weight of tamarind seed gelose is used. With an amount less than that the desired result cannot be obtained. Again, generally there is little advantage of using more than 0.5% by weight of tamarind seed gelose. The relationship between the concentration and viscosity of an aqueous solution of tamarind seed gelose is shown in Table 1 below.

TABLE 1.—VISCOSITY OF AN AQUEOUS SOLUTION OF TSJ (25° C.)

| | Concentration (percent) | | | | | | | | | |
|---|---|---|---|---|---|---|---|---|---|---|
| | 0.05 | 0.1 | 0.2 | 0.3 | 0.4 | 0.5 | 0.6 | 1.0 | 1.5 | 2.0 |
| Viscosity (cps.) | 1 | 2 | 3 | 6 | 10 | 18 | 30 | 158 | 740 | 2,200 |

In majority of the cases, it is sufficient to use 0.2–0.4% to the total weight of tamarind seed gelose. The viscosity of an aqueous solution of tamarind seed gelose is far less sensitive to pH change or presence of other electrolytes compared with that of sodium carboxymethylcellulose.

The manner of mixing tamarind seed gelose with a mix for a frozen dessert is not critical. Generally preferred procedure is to dissolve tamarind seed gelose in warm water, and to mix the same with the mix for the frozen dessert. Tamarind seed gelose is well miscible with the mix. The resultant mixture is sterilized with heat, and cooled. The viscosity of the mixture which contains tamarind seed gelose does not rapidly rise upon the cooling. (Cf. Example 3.) Again this mixture does not require any particular aging. By freezing the mixture with stirring as is the conventional practice, the desired frozen dessert can be obtained. The period and degree of exhibition of the over run effect when tamarind seed gelose is used as the stabilizer are very suitable for the production of a frozen dessert. (Cf. Example 4.) In case of making fruit sherbet or water ice having a sugar concentration less than about 30%, it is recommended to co-use a minor amount of other suitable stabilizer with tamarind seed gelose. For example, additon of 1 part of methylcellulose per 14 parts of tamarind seed gelose gives good over run effect. It is also possible to optionally co-use one or more of other stabilizers with tamarind seed gelose. For example, in case of preparing ice cream and ice milk, other suitable stabilizers can be co-used to perfectly prevent whey off. For example, addition of 1 part of carrageenin, 2 parts of sodium alginate or 2 parts of low methoxy pectin to 6 parts of tamarind seed gelose causes perfect prevention of whey off, and thereby the action of tamarind seed gelose can be enhanced.

The products prepared with the use of tamarind seed gelose have excellent heat shock resistance (Cf. Example 2) and water-holding property, and do not show the separation of ice crystals and sugar after long period of storage, nor such phenomenon as a structural breakdown due to temperature change. The products are very pleasant to palate, and particularly sherbets are found to have unique taste absent in the conventional products.

Hereinbelow the present invention shall be explained with reference to the examples.

EXAMPLE 1

*Preparation of a fruit sherbet*

| | Kg. |
|---|---|
| Ice cream mix [1] | 1.0 |
| 1/5 concentrated natural orange juice | 0.25 |
| Pulverized beet sugar | 3.0 |
| Citric acid | 0.025 |
| Tamarind seed gelose | 0.02 |
| Pectin | 0.02 |
| Water, balance to make the total of | 10.0 |

[1] The ice cream composed of 12% milk fat, 10.5% defatted milk powder, 15% beet sugar, and 0.3% of an emulsifier.

To warm water of 40–50° C., tamarind seed gelose was gradually added with stirring, and dissolved to make a 2% tamarind seed gelose solution, to which a 2% pectin solution was added. Thus a stabilizer solution was prepared. To the same, the ice cream mix, orange juice, citric acid and sugar were added. To the mixture, finally water was added to make the total weight 10 kg., followed by a thorough stirring and mixing. Thus prepared mix solution was cooled and frozen with stirring to provide the final product.

EXAMPLE 2

| | Kg. |
|---|---|
| Ice cream mix [1] | 1.0 |
| 1/5 concentrated natural orange juice | 0.25 |
| Beet sugar | 2.0 |
| Dextrose | 0.8 |
| Citric acid | 0.025 |
| Tamarind seed gelose | 0.03 |
| Coloring matter and food flavour | Traces |
| Water, balance to make the total of | 10.0 |

[1] The composition of the ice cream mix was the same as in Example 1.

A fruit sherbet was prepared following the procedures of Example 1, from the above components of the each specified amounts.

As a control, three other types of fruit sherbets were prepared, each added with, in place of tamarind seed gelose, the equal amount of methyl cellulose, acid-resistant carboxymethyl cellulose, and propylene glycol alginate.

From thus prepared four samples, each a cake of 4 cm.³ was taken, and their melt down state was observed under the conditions of 20° C. temperature and 53% humidity. The results are shown in Table 2 below. Over run was, in the every case, about 60%.

TABLE 2.—HEAT SHOCK RESISTANCE

| Time (min.) | Stabilizer | | | |
|---|---|---|---|---|
| | TSJ | MC | Acid-resistant CMC | Propylene glycol alginate |
| 0 | − [1] | − | − | − |
| 10 | − | ± | − | ++ |
| 20 | ± | + | + | ++ |
| 30 | ++ | ++ | +++ | +++ |
| 40 | +++ | +++ | +++ | +++ |
| 50 | ++++ | ++++ | ++++ | ++++ |

[1] "−" denotes no change, and "++++" denotes the completely melt state, with which the recognition of the original shape was impossible. "±", "+", "++", and "+++" denote the intermediate state between "−" and "++++", by the order of the degree of the change from small to great.

As is apparent from Table 2, tamarind seed gelose has a high heat shock resistance, and therefore gives sherbet which keeps good shape during storage.

EXAMPLE 3

Six samples were prepared by adding to the mixture composed of

| | Kg. |
|---|---|
| Saltless butter | 0.3 |
| Defatted milk powder | 1.2 |
| Beet sugar | 1.6 |
| Emulsifier | 0.03 |
| Food flavour | Traces | each separately 0.03 kg. of TSJ (Sample 2), carrageenin (Sample 3), locust bean gum (Sample 4), sodium alginate (Sample 5) and sodium carboxymethyl cellulose (Sample 6). The above mixture without addition of any stabilizer was used as Sample 1. To those, water was added to make the total weight of each sample 10 kg. The relationship between the viscosity of thus prepared ice milk pre-mixture and temperature change is shown in FIG. 1, the axis of ordinates standing for viscosity (cps.) of the pre-mixture, and that of abscissas standing for temperature (° C.). Again, if the actually measured values as of the Samples 3, 4 and 5 are to be indicated as they are, a very large space will be required. Therefore, as for Sample 3, one-twentieth of the actually measured values; as for Sample 4, one-fifth; and for Sample 5, one-tenth; are given in the graph.

As is apparent from FIG. 1, the pre-mixture added with tamarind seed gelose in accordance with the present invention shows little viscosity change depending on temperature.

EXAMPLE 4

Six samples were prepared by adding as a stabilizer to a mixture composed of

| | Percent |
|---|---|
| Saltless butter | 3 |
| Emulsifier | 0.3 |
| Defatted milk powder | 3 |
| Beet sugar | 22 | each 0.3/ of TSJ (Sample 1), TSJ+carrageenin (6:1) (Sample 2), sodium alginate (Sample 3), locust bean gum (Sample 4), CMC (Sample 5) and MC (Sample 6). The relationship between over-run and freezing time seen in each of the ice milk prepared from the six samples is shown in FIG. 2. In FIG. 2, the axis of ordinates stands for over run (percent), and that of abscissas, for freezing time (min.).

EXAMPLE 5

*Preparation of ice cream*

| | Kg. |
|---|---|
| Raw cream (fat content 45%) | 2.6 |
| Defatted milk powder | 1.0 |
| Beet sugar | 1.5 |
| Emulsifier | 0.03 |
| Tamarind seed gelose | 0.022 |
| Sodium alginate | 0.008 |
| Water, balance to make the total of | 10.0 |

To warm water of 40–50° C. tamarind seed gelose was gradually added with stirring, dissolved, and made into a 2.2% tamarind seed gelose solution. To the same, a 2% sodium alginate solution was added to form a stabilizer solution. To that solution another solution composed of raw cream, defatted milk powder, best sugar and emulsifier was added, and further was added thereto to make the total weight 10 kg., followed by a thorough stirring and mixing. Thus prepared mix solution was cooled and frozen under stirring to provide the final product.

EXAMPLE 6

*Preparation of water ice (juice sherbet)*

| | Kg. |
|---|---|
| 1/5 concentrated orange juice | 0.25 |
| Beet sugar | 2.1 |
| Dextrose | 0.9 |
| Citric acid | 0.25 |
| Tamarind seed gelose | 0.028 |
| Methylcellulose | 0.002 |
| Coloring matter and food flavour | Traces |
| Water, balance to make the total of | 10.0 |

From the above components, water ice was prepared following substantially the procedures of Example 1.

We claim:
1. The method of producing a frozen dessert which comprises adding to the mix for said dessert selected from the group consisting of ice cream, ice milk, fruit sherbet and water ice from 0.05 to 0.5 percent based on the total weight, of tamarind seed gelose as a stabilizer.
2. The method of producing a frozen dessert which comprises adding to the mix for said dessert selected from the group consisting of ice cream, ice milk, fruit sherbet and water ice from 0.2 to 0.4 percent, based on the total weight, of tamarind seed gelose as a stabilizer.
3. A composition selected from the group consisting of an ice cream, ice milk, fruit sherbet and water ice, said composition comprising as an ingredient from 0.05 to 0.5 percent, based on the total weight, of tamarind seed gelose.
4. A composition selected from the group consisting of ice cream, ice milk, fruit sherbet and water ice, said composition comprising as an ingredient from 0.2 to 0.4 percent, based on the total weight, of tamarind seed gelose.

References Cited

Jacobs, Food, 1951, pp. 1975–1976.
Frandsen et al., Ice Cream, 1961, pp. 64 and 66.
RAO, Tamarind Seed Gelose, J. of Sc. and Ind. Research, A—general, 1957, pp. 138–140.

A. LOUIS MONACELL, *Primary Examiner.*

M. VOET, *Assistant Examiner.*